United States Patent
Oron et al.

(10) Patent No.: US 10,073,285 B2
(45) Date of Patent: Sep. 11, 2018

(54) TEMPERATURE RESPONSIVE OPTICAL LIMITER, COMPOSITION AND DEVICE

(71) Applicants: Moshe Oron, Rehovot (IL); Doron Nevo, Ra'anana (IL); Noam Gross, Kiryat Ono (IL); Ariela Donval, Rosh Haayin (IL)

(72) Inventors: Moshe Oron, Rehovot (IL); Doron Nevo, Ra'anana (IL); Noam Gross, Kiryat Ono (IL); Ariela Donval, Rosh Haayin (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 15/458,055

(22) Filed: Mar. 14, 2017

(65) Prior Publication Data

US 2018/0004018 A1    Jan. 4, 2018

(30) Foreign Application Priority Data

Mar. 17, 2016 (IL) .......................... 244633

(51) Int. Cl.
*B32B 5/16* (2006.01)
*B32B 19/00* (2006.01)
(Continued)

(52) U.S. Cl.
CPC .......... *G02F 1/0147* (2013.01); *C03C 17/007* (2013.01); *C03C 17/32* (2013.01);
(Continued)

(58) Field of Classification Search
CPC ............... G02F 1/0147; G02F 2202/36; G02F 2202/28; E06B 9/24; E06B 3/6722;
(Continued)

(56) References Cited

U.S. PATENT DOCUMENTS

| 3,790,250 A | 2/1974 | Mitchell et al. |
| 4,261,331 A | 4/1981 | Stephens |

(Continued)

FOREIGN PATENT DOCUMENTS

WO    9964488 A1    12/1999

OTHER PUBLICATIONS

"Temperature-responsive hydrogel with ultra-large solar modulation and high luminous transmission for 'smart window' applications", Yang Zhou et. al., J. Mater. Chem. A, 2014, 2, 13550-13555.
(Continued)

*Primary Examiner* — William K Cheung
(74) *Attorney, Agent, or Firm* — Pearl Cohen Zedek Latzer Baratz LLP (57) ABSTRACT

The present invention relates to optical power-limiting devices, and more particularly, to an optical power-limiting passive (self-adaptive) device and to a method for limiting solar power transmission in devices such as windows, using scattering level changes in a novel thermotropic composition that contains salt nano or microparticles embedded in a solid transparent host layer, where temperature change induces change in the refraction index of the matrix as well as of the embedded particles, creating a scattering layer, substantially reflecting the incident light thus limiting the amount of light passing through the window, green house covers, car sun roofs, solar panel windows and protection layers on housing roofs and walls, as a function of ambient temperature.

25 Claims, 10 Drawing Sheets

(51) Int. Cl.
*G02F 1/01* (2006.01)
*E06B 9/24* (2006.01)
*E06B 3/67* (2006.01)
*C03C 17/00* (2006.01)
*C03C 17/32* (2006.01)
*G02B 5/30* (2006.01)

(52) U.S. Cl.
CPC .............. *E06B 3/6722* (2013.01); *E06B 9/24* (2013.01); *C03C 2217/70* (2013.01); *E06B 2009/2417* (2013.01); *G02B 5/3025* (2013.01); *G02F 2202/28* (2013.01); *G02F 2202/36* (2013.01)

(58) Field of Classification Search
CPC ........... E06B 2009/2417; C03C 17/007; C03C 17/32; C03C 2217/70; G02B 5/3025
USPC ........................................ 428/328, 357, 402
See application file for complete search history.

(56) References Cited

U.S. PATENT DOCUMENTS

| 9,128,307 | B2 | 9/2015 | Broekhuis et al. | |
|---|---|---|---|---|
| 2006/0159874 | A1 | 7/2006 | Koran et al. | |
| 2008/0008857 | A1 | 1/2008 | Kalkanoglu et al. | |
| 2013/0193386 | A1 | 8/2013 | Owen | |
| 2014/0087086 | A1 | 3/2014 | Nair et al. | |
| 2015/0119520 | A1* | 4/2015 | Seeboth | C08F 2/22 |
| | | | | 524/504 |

OTHER PUBLICATIONS

"Temperature Control of Light Transmission Using Mixed System of Silica Hollow Particles with Nanoparticle Shell and Organic Components", M. Fujiwara et.al, ACS Appl. Mater. Interfaces 2015, 7, 1107-1113.

"Thermotropic and Thermochromic Polymer Based Materials for Adaptive Solar Control", A. Seeboth et.al, Materials 2010, 3, 5143-5168.

* cited by examiner

TEMPERATURE RESPONSIVE OPTICAL LIMITER, COMPOSITION AND DEVICE

FIELD OF THE INVENTION

The invention generally relates to an optical power-limiting composition for application as a coating or laminate upon windows or similar articles, to limit the transmission of solar energy entering into a dwelling, for climate control. The composition is formulated to be thermotropic, namely it becomes translucent only when a known temperature is reached. Thus a rise in outdoor temperature will result in a translucent coated window, which prevents solar energy from passing through and overheating the dwelling. The optical change of the composition is reversible when temperatures drop, and the composition then returns to its transparent state. The invention describes optical articles comprising the composition, such as windows.

BACKGROUND OF THE INVENTION

"Smart windows" regulate the amount of solar energy penetrating a room through the window, for the sake of comfort, or to provide savings in cooling and heating costs. This regulation can be actively controlled, such as in electrochromic windows.

Alternatively, the windows can be self-adaptive, and can have different optical properties in response to a change in the ambient temperature: Thermochromic windows exhibit a change in their color and absorbance. Thermotropic windows exhibit a change in their light scattering, and reduced transmission. The solar power transmission change has to be reversible, i.e. the materials or compositions should revert back to their original transmission when the temperature is reverted, in order for these materials to be applicable as smart windows.

Temperature responsive optical devices for providing light filtration are known in the art. Chalcogenide glassy semi-conductors such as those described in U.S. Pat. No. 3,790,250, for example, display temperature dependent light transmission characteristics.

Similarly, thermochromic materials are described in U.S. Pat. No. 9,128,307, and U.S. Pat. Publication 2013/0193386, and display temperature dependent color changes. These are based on materials which display a temperature dependent absorption. Such filtering devices are expensive for use in large area devices such as window panes. Furthermore, the filtration is achieved by absorption. Therefore, the filter itself, or the window itself, heats up, necessitating positioning of the filter away from the inside of the room or the temperature sensitive components.

Another design method of temperature responsive optical devices for providing light filtration is by reflection in multi-layer coatings having alternating low-high index of refraction, at high environmental temperature, such as those described in U.S. Pat. No. 9,128,307 and U.S. application 20060159874. These have usually high production costs due to the number of layers needed and have a physical problem since the reflection efficiency is dependent on the angle of impingement.

Another design method of temperature responsive optical devices for providing light filtration by reflection is presented by U.S. Pat. No. 4,261,331 where a transparent liquid is used as a temperature responsive optical devices for providing light filtration by scattering and reflection. This solution comprises a layer of a metal sulfate salt solution in thermal contact with a source of heat. The solution is characterized as having decreasing salt solubility with increasing temperature. When the heat source exceeds a predetermined temperature, the solution precipitates salt as a light scattering layer, substantially reflecting incident light in the solar spectrum. This solution uses a liquid layer, which is very troublesome in windows, needing special sealing techniques and complicated, costly production methods.

Another design method of temperature responsive optical devices for providing light filtration is via scattering, which is induced by refractive indices changes of a substance, relative to its host, as a function of temperature. An example of composition of blended polymers is described in "Thermotropic and Thermochromic Polymer Based Materials for Adaptive Solar Control", A. Seeboth et. al, Materials 2010, 3, 5143-5168. It teaches blends, composed of two polymers, which are non-soluble in one another, and have different temperature dependencies of their refractive indices. Its main drawback is the thick polymer layer, in the order of a few millimeters, needed to obtain a significant filtration effect.

Another thermotropic apparatus is described in "Temperature Control of Light Transmission Using Mixed System of Silica Hollow Particles with Nanoparticle Shell and Organic Components", M. Fujiwara et. al, ACS Appl. Mater. Interfaces 2015, 7, 1107-1113. Light transmission of a mixture of silica hollow particles with nanoparticle shell in various hydrocarbon solvents is varied with changes in temperature. The mechanism of the transparency variation is the adjustment of the refractive indices of the silica hollow particle and the organic components. As the refractive index alteration of the organic components with temperature is generally 10 times higher than that of silica, the difference in the refractive indices between them, induced by the temperature variation, changes the transparency of the mixture. However, the host described in this case is in liquid form, which makes it about impossible to be implemented in fenestration designs, where the liquid large thermal expansion and contraction can break the glass panes holding it, and the liquids may freeze into ice at cold temperatures. Moreover, the scattering substance is a hollow nanoparticle that may not be easily utilized with hosts that are not in liquid form.

Another design method of temperature responsive optical devices for providing light filtration is based on temperature-responsive hydrogels using poly(N-isopropylacrylmide) (PNIPAm), as described in "Temperature-responsive hydrogel with ultra-large solar modulation and high luminous transmission for 'smart window' applications", Yang Zhou et. al., J. Mater. Chem. A, 2014, 2, 13550-13555. This hydrogel based device contains water in its liquid form, therefore good sealing is essential to prevent water evaporation that can hamper its operation. While the device described in the publication endured 20 cycles of measurement, this is not enough to indicate that the performance stability would be reliable in actual smart window applications.

In contrast, the present invention provides a composition useful as a coating or laminate for application upon windows or similar articles, to limit the transmission of solar energy entering into a dwelling, for climate control. The invention utilizes optical scattering and reflection, preferably using a single thin solid layer. The invention overcomes the disadvantages of the prior art, such as being independent of the angle of impingement, being non-absorbing and utilizing inexpensive materials and manufacturing methods. The invention provides over-temperature protection for a window having considerable solar exposure, such as on hot days. The composition of the invention allows transmission of the entire solar spectrum through the window on cold days.

The composition may be applied to windows that have already been installed, thus allowing retrofitting and upgrading of existing windows.

These and other advantages will be enlarged upon in the Summary and Detailed Description of the Invention that follow.

SUMMARY OF INVENTION

The invention provides an optical power-limiting passive (self-adaptive) composition and a method for limiting solar power transmission in articles coated or laminated with the composition, (e.g. coated windows), using scattering level changes in a novel thermotropic composition that contains salt nanoparticles, salt microparticles or salt encapsulated particles, embedded in a solid transparent host layer. Temperature change induces change in the refraction index of the matrix as well as of the embedded particles, creating a scattering layer, substantially reflecting the incident light, and thus limiting the amount of light passing through the coated article (as a function of ambient temperature). Examples of coated articles may be: a window, a green house cover, sun roofs, solar panel windows, protection layers on housing roofs and walls.

In one embodiment, this invention uses nano and/or microscale transparent particles embedded in a thin, transparent host, e.g. nano or micro-crystals of known salts to provide optical power-limiting articles, and more particularly, an optical power-limiting passive, self-adaptive, device, limiting solar power transmission in devices such as windows, using reflection and scattering level changes in a novel thermotropic composition that contains salt nano and/or microparticles embedded in solid transparent host layer, where temperature change induces change in the refraction index of the matrix as well as of the embedded particles, thus creating an index change between the matrix and the particles, forming a scattering layer, substantially reflecting the incident light, thus limiting the amount of light passing through the window as a function of ambient temperature.

In another embodiment, this invention uses nano and/or microscale transparent salt particles embedded in a thin, less than 500 micrometers layer of transparent host, to provide an optical power-limiting-devices, and more particularly, limiting solar power transmission in devices such as windows, using reflection and scattering level changes.

In another embodiment, at a pre-determined temperature the refractive indices of the host matrix layer and the embedded scattering particles are almost similar, yielding very low light scattering and relatively high transmittance. Due to the fact that the change in refractive index as a function of temperature is different for the host matrix and the embedded particles, the composition exhibits increased scattering and hence reduced transmission as the temperature changes away from the predetermined value. These thermotropic compositions revert from being transparent to being translucent as a function of ambient temperature.

In another embodiment, the described above layer composition can be used as a smart window because its optical properties change as a function of ambient temperature and it can be tailored to promote energy savings in the following way: At winter time, when ambient temperature is low, it is designed to be in its "Off" transparent state thus allowing light and heat to enter the room and save on lighting and heating expenses. During summer time, when ambient temperature is high, the window turns to its "On" state where it is opaque to a degree determined at production stage and back-scatters most of the heat and light impinging on it thus saving on cooling expenses while still allowing some light in to save on lighting expenses.

In another embodiment, for this apparatus to work successfully the host matrix and the particles have to be such that at the "Off" temperature their refractive indices will be similar and at the "On" temperature range it will be different. This can be achieved e.g., by selecting the matrix to be based on organic polymers of which refractive index vary extensively as a function of temperature whereas the particles to be made of inorganic material, such as various salts, of which refractive index vary in a much slower rate as a function of temperature.

In another embodiment, the "Off" state ambient temperature, where the composition is transparent, is designed by adjusting the refractive indices of the host and the particles to be similar at this temperature. This can be designed e.g., by mixing two compatible polymeric matrices together where the first has a refractive index higher than the particle's material and the second has a lower refractive index than the particle's material. Mixing the two polymers in different ratios allows for a precise tuning of the exact temperature of the "off" state.

One embodiment uses a host matrix embedded with micro or nano crystals of salt, sandwiched or laminated between two transparent layers of glass, polymer or crystal panes.

Another embodiment uses a host matrix embedded with micro or nano crystals of salt, as a laminating layer adhered or glued to transparent glass or polymer window-panes.

Another embodiment uses a host matrix embedded with micro or nano crystals of salt where all are environmentally friendly, not endangering the environment at their termination of life as described below.

The host matrix in the thermotropic compositions can be organic-based, e.g., a polymer film, a polymerizable composition, or a transparent adhesive, or inorganic-based, e.g., mineral glass, sol-gel, and any other window based material, and an inorganic-organic composite, e.g., UV cured transparent adhesives such as, NOA61, NOA85 (made by Norland Optical adhesives), OG146, 0G134 (made by Epoteck), OP52 (made by Dymax) and others; Epoxy based transparent adhesives such as 353ND (made by Epoteck), DP100 (made by 3M); Silicone based transparent adhesives such as Sylgard 184 (made by Dow Corning), R2615 (made by Nusil); Further examples for polymer host matrices are (but not limited) Polyvinyl butyral (PVB), Cellulose acetate butyrate (CAB), Cellulose acetate (CA), Acrylic polymers and mixtures and mixed composition of the above mentioned materials, and any combination thereof.

A further embodiment provides a composition of the embedded micro or nano crystals of transparent salt, e.g., LiF, LiCl, LiBr, LiI, NaF, NaCl, NaBr, NaI, KF, KCl, KBr, KI, RbF, RbCl, RbBr, RbI, CsF, CsCl, CsBr, CsI, BaF2, CaF2, MgF2, ZnSe, ZnS as well as mixtures and mixed composition particles, and any combination thereof.

A further embodiment provides various stabilizers that can be used in the thermotropic compositions include hindered amine light stabilizer (HALS), UV absorbers, thermal stabilizers, singlet oxygen quenchers, various antioxidants, and any combination thereof.

A further embodiment provides a method for tuning of "Off" state temperature via mixing of two optical adhesives, A and B, which have different refractive indices; the former has a higher value and the latter has a lower value than that of salt at room temperature. By changing the mixing ratio the transparency temperature is shifted e.g. from peak at ~35° C. to peak at ~10° C. In this manner the "Off" state temperature can be tailored per application, e.g., in the case of windows dedicated to different geographical locations or windows that are exposed or not exposed to direct sunlight that may add to ambient temperature.

According to one aspect of the present invention, various salt nanoparticles and/or microparticles of the thermotropic compositions can be further coated or encapsulated with a coating.

According to another aspect of the present invention the salt nanoparticles are encapsulated together with the various nanoparticles and/or microparticles. The coating can serve a number of functions, such as protection of the core composition from oxidation or any form of degradation, blocking out harmful radiation, and changing the chemical nature of the particles (hydrophobic/hydrophilic) and hence the dispersability of the nanoparticles and/or microparticles.

A further embodiment of the present invention provides light absorbing dyes, pigments or nano-particles, e.g. carbon-black or lanthanum hexaboride, that are also embedded in the host material along with the scattering particles. The inclusion of these absorbers in the device increases the modulation of light attenuation between the "Off" and "On" states. During the "Off" state, when the device is transparent, these light absorbers provide some attenuation of visible and/or infrared solar light that can be controlled in the production stage via the absorbers concentration in the device. During the "On" state, when the device becomes translucent due to scattering of light, the absorption of light penetrating the device by the light absorbing particles, dyes or pigments is enhanced because of the longer path the light is taking through the host material due to scattering. In other words, light transferring from one side of the device to the other has a larger probability to be absorbed in the "On" state than in the "Off" state due to the longer optical path.

According to another aspect of the present invention thermochromic nano-particles, such as Vanadium dioxide ($VO_2$), are also embedded in the host material along with the scattering particles. The inclusion of $VO_2$ in the device increases the modulation of light attenuation between the "Off" and "On" states. During the "Off" state, when the device is transparent, the $VO_2$ nanoparticles provide little attenuation of visible and infrared solar light that can be controlled during production stage via the $VO_2$ concentration in the device. During the "On" state, when the device becomes translucent and scatters light due to higher ambient temperature, the absorption of the thermochromic $VO_2$ nano-particles increases due to a phase change from insulator to metallic that the $VO_2$ material is going through. In this case, the absorption of the metallic state $VO_2$ nano-particles is enhanced two folds; first because of the longer path the light is taking through the host material due to the scattering and second because of its phase transition. In other words, light transferring from one side of the device to the other has a larger probability to be absorbed in the present invention thermotropic device than in a simple thermochromic device containing $VO_2$ nanoparticles due to the longer optical path.

According to another aspect of the present invention the thermotropic device is positioned between two polarizers oriented in the same polarization. In the "Off" state the first polarizer attenuates the light by approximately 50% and linearly polarizes it. The light then propagates through the thermotropic layer and the second polarizer with no significant further attenuation. In the "On" state, as well, the first polarizer attenuates the light by approximately 50% and linearly polarizes it. However, then the passing light propagates through the scattering medium and due to the scattering it loses part of its linear polarization. When light reaches the other side of the scattering thermotropic medium it is mostly arbitrarily polarized and therefore being further attenuated by the second polarizer. In that way, the modulation between the "Off" and "On" states attenuation is increased as compared to the stand alone thermotropic device.

BRIEF DESCRIPTION OF THE DRAWINGS

The invention will now be described in connection with certain preferred embodiments with reference to the following illustrative figures so that it may be more fully understood. With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention.

DETAILED DESCRIPTION OF THE INVENTION

Figure 1:
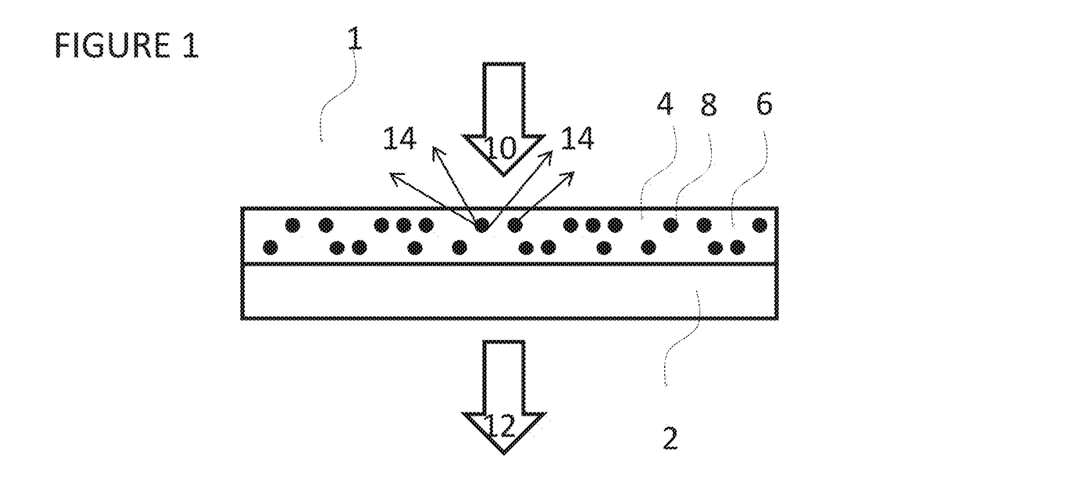
FIG. 1 depicts a cross-sectional view of the thermotropic device in coated layer configuration.

FIG. 1 depicts a cross-sectional view of the thermotropic article in coated layer configuration 1.

The thermotropic coating layer 4 is composed of the host matrix 6 and the scattering nano or microparticles 8 and it is deposited on a transparent substrate 2, such as a glass window or PET sheet, by e.g. dip coating or any other wet coating, on a single window or roll to roll method.

Light enters in direction 10.

On cold days, the coating composition is transparent and allows the majority of the light and heat to be transmitted there-through and exit at the far side, in direction 12. The coating of the invention therefore provides the dwelling with energy savings by lowering heating and lighting costs.

On hot days, the coating is translucent, and light and heat is backscattered-reflected in direction 14, so it does not enter a dwelling, and the interior of the dwelling remains cool.

Figure 2:
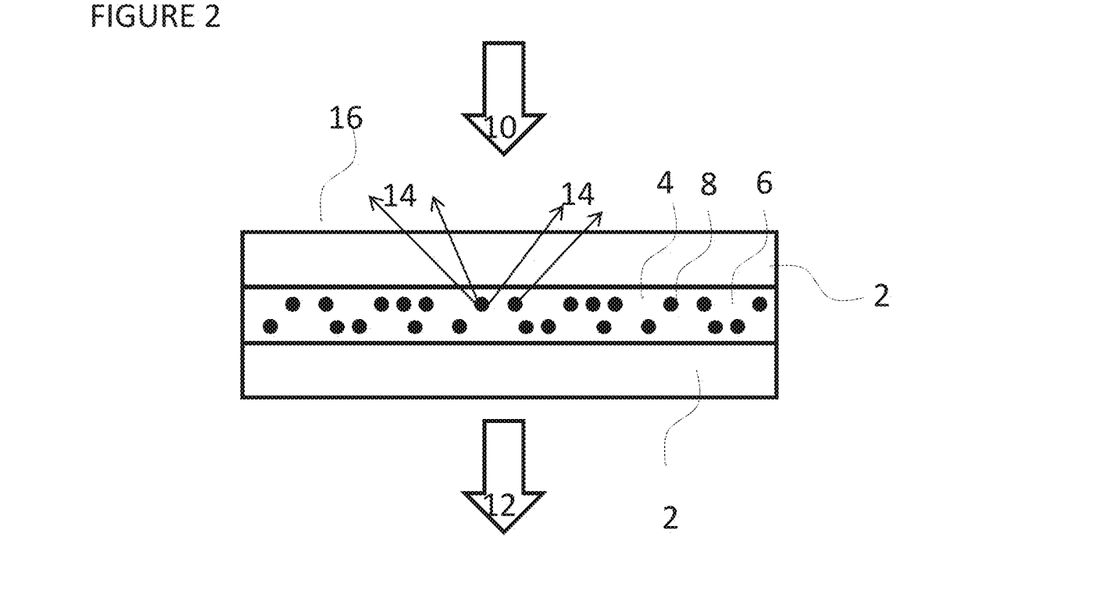
FIG. 2 depicts a cross-sectional view of the thermotropic device in laminated layer configuration.

FIG. 2 shows a cross-sectional view of the thermotropic device in a laminated layer configuration 16. The thermotropic layer 4 is composed of the host matrix 6 and the scattering nano or microparticles 8 and it is deposited in between two transparent substrates 2, such as glass or PET sheet.

Light enters in direction 10.

On cold days, the coating composition is transparent and allows the majority of the light and heat to be transmitted there-through and exit at the far side, in direction 12. The coating of the invention therefore provides the dwelling with energy savings by lowering heating and lighting costs.

On hot days, the coating is translucent, and light and heat is backscattered-reflected in direction 14, so it does not enter a dwelling, and the interior of the dwelling remains cool.

Figure 3A:
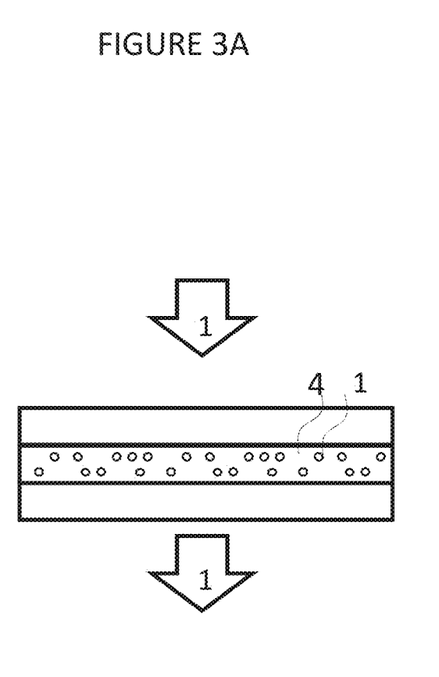
FIG. 3A depicts a scheme of the thermotropic window in the "On" state.
Figure 3B:
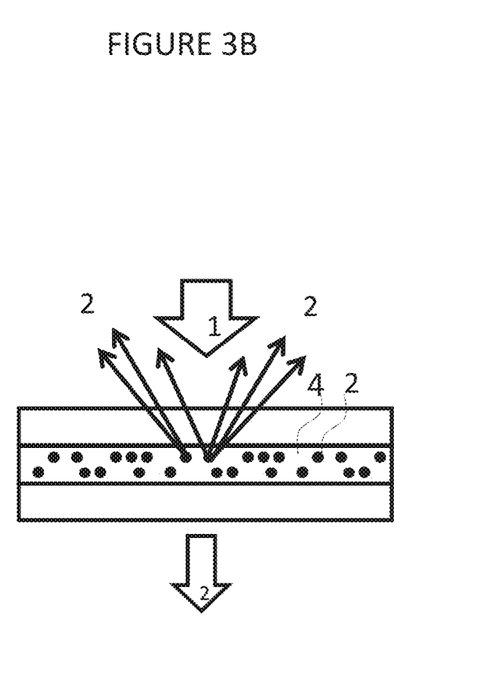
FIG. 3B depicts a scheme of the thermotropic window in the "Off" state.

FIG. 3 depicts a scheme of the thermotropic window 16, as described in FIG. 2, in "Off" (a) and "On" (b) states. The "Off" state (a) is active when ambient temperature is cold. The window is transparent allowing most of the solar light and heat 10 to penetrate the room, in direction 12, hence saving on lighting and heating energy costs. When ambient temperature is high, such as during summer time, the window (b) turns translucent and is partially opaque. In this case the window blocks most of the heat while allowing some light to penetrate the room in direction 22 hence helping reduce cooling expenses. The transition between "On" and "Off" states is governed solely by ambient temperature. In the (a) case, cold ambient temperature, the salt particles 18 in the thermotropic layer 4 have the same index of refraction as the host, thus window (a) is transparent. In the (b) case, hot ambient temperature, the salt particles 20 in the thermotropic layer 4 have different index of refraction than the host, thus window (b) turns scattering and reflective, sending the scattered light mainly in directions of arrows 24.

Figure 4:
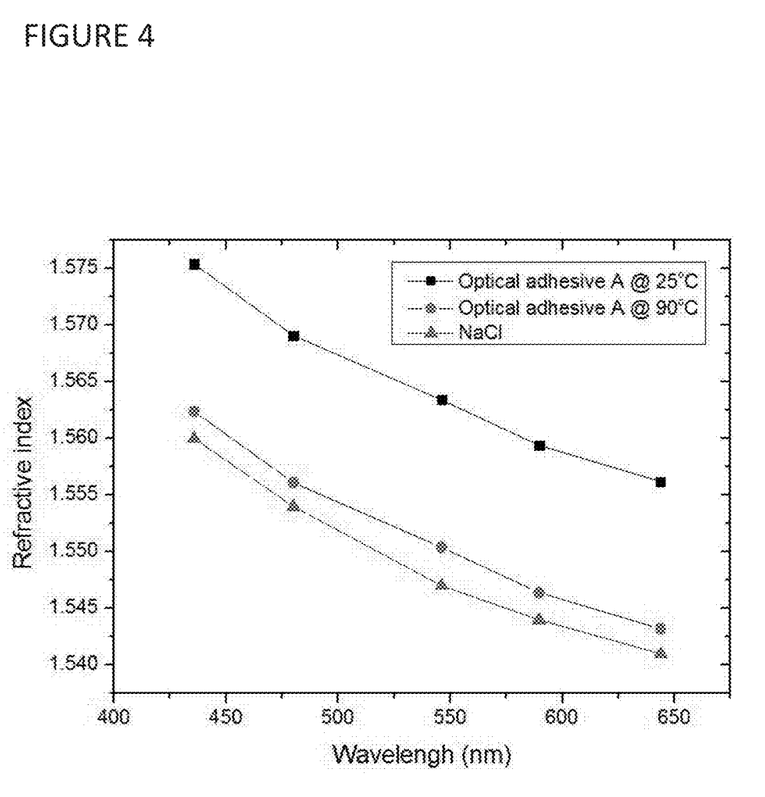
FIG. 4 depicts the change in refraction index of NaCl and an optical adhesive as a function of wavelength at 25° C. and 90° C.

FIG. 4 depicts the change in refraction index of the table salt NaCl and transparent optical adhesive A as a function of the wavelength at 25° C. and 90° C. The optical adhesive's refractive index changes at a rate of $\sim -2 \times 10^{-4}/°$ K, while the NaCl rate of change is much smaller.

In the upper graph, optical adhesive A was used as a host matrix for NaCl particles, and a thermotropic coating is obtained with an "Off" temperature, in which it is transparent, at approximately 100° C. where the two lower refraction indexes curves are shown in the graph to be about identical.

Figure 5:
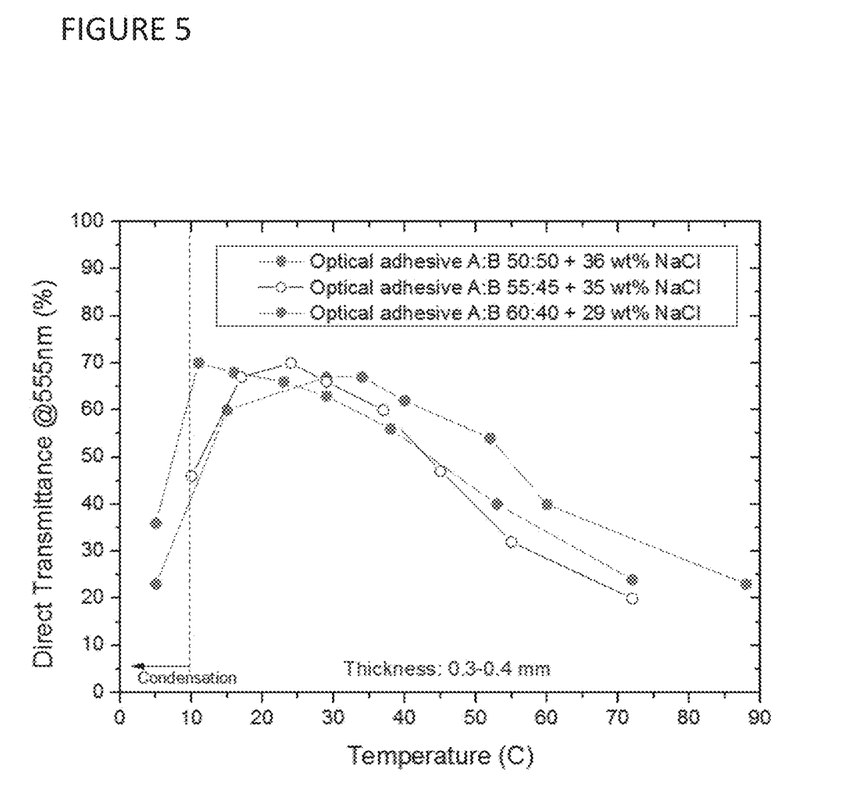
FIG. 5 depicts the tuning of "Off" state temperature via mixing ratio of 2 optical adhesives with different refractive indices.

Referring to FIG. 5, in order to make this device suitable for the use in smart windows application the "Off" temperature should be adjusted to ~20° C. and this can be done by mixing optical adhesive A in the right amount with optical adhesive B for which the refractive index at 20° C. is lower than that of NaCl.

FIG. 5 depicts tuning of "Off" state temperature via mixing ratio of two optical adhesives, A and B, which have different refractive indices; The former has a higher value and the latter has a lower value than that of NaCl at room temperature. By changing the mixing ratio between 50:50 and 60:40 the transparency temperature was shifted from peak at ~35° C. to peak at ~10° C. In this manner the "Off" state temperature can be tailored per application, for example in case of windows dedicated to different geographical locations or windows that are exposed or not exposed to direct sunlight that may add to ambient temperature. The "Off" state can be seen to span along 20 degrees Celsius before the transparency is gradually reduced as the window turns translucent. It should be noted that below 10° C. condensation of water from the air settling on the window interfered with the measurements and artificially reduced the transmittance value. The thermotropic layer used in this measurement was of thickness of ~0.3 to 0.4 mm. The NaCl used is commercial sea salt mixed with the optical adhesives.

Figure 6:
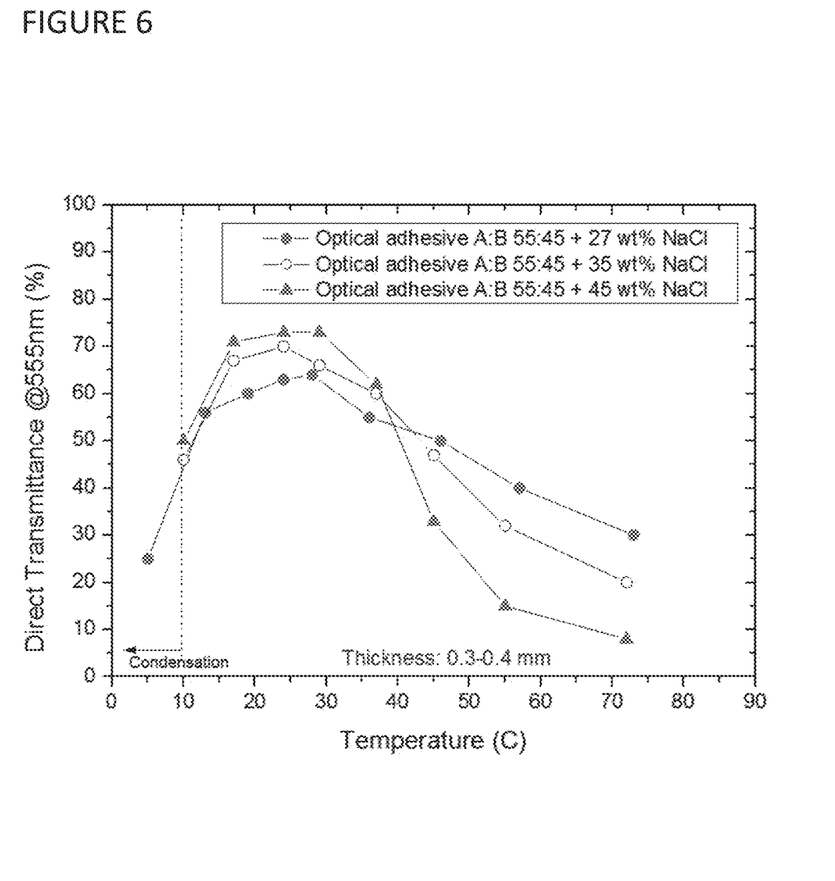
FIG. 6 depicts the tuning of "On" state threshold temperature and attenuation degree via scattering particles concentration.

FIG. 6 depicts thermotropic devices of which the host material is a mixture of optical adhesives A and B at a ratio of 55:45, respectively. The three devices that were measured for specular transmittance at 555 nm wavelength, as a function of ambient temperature are different in the concentration of scattering NaCl particles embedded in them. The concentrations presented are 27, 35 and 45 weight percent. The NaCl used is ground commercial sea salt, mixed with the optical adhesives.

As can be seen in FIG. 6, changing the concentration of NaCl has minor to no effect on the transparent state, while it is very influential on the behavior in the "On" state and the transition between states. The larger the concentration, the less transmittance is observed in the "On" state, which in this case can be said to be above 45° C. Also, the transition between "Off" and "On" states is more abrupt and specific attenuation can be reached at a lower temperature when concentration is higher.

Thus, varying the concentration of scattering particles in the thermotropic device one can tailor the right amount of light and heat attenuation in the "On" state and its threshold temperature.

Figure 7:
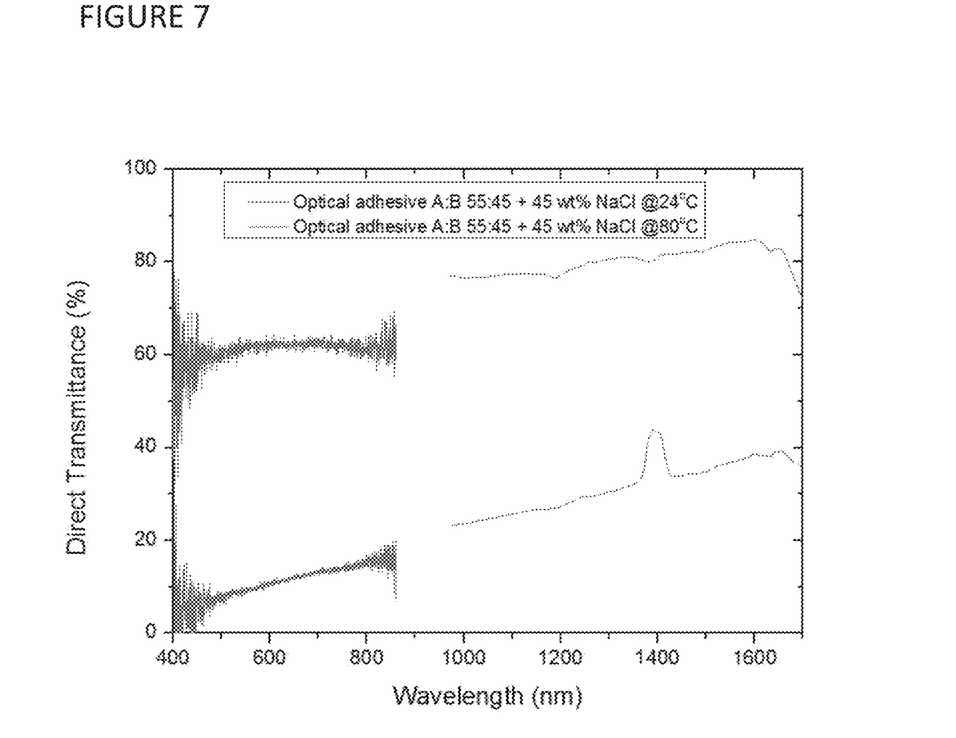
FIG. 7 shows transmission spectra at various temperatures.

FIG. 7 shows direct transmission spectra at 24° C. and at 80° C. of the thermotropic device in which the host material is a mixture of optical adhesives A and B at a ratio of 55:45, respectively, and the concentrations of NaCl particles is 45 wt %. Transmission was acquired with two different tools for the visible and the infrared part of the spectrum hence the discontinuities between 850 and 950 nm and the slight offset observed for the 24° C. measurement.

As can be seen, in this case visible light direct transmission is attenuated from ~60% to ~10% with increasing temperature, while the total solar power is attenuated from ~70% to ~15%.

Figure 8A:
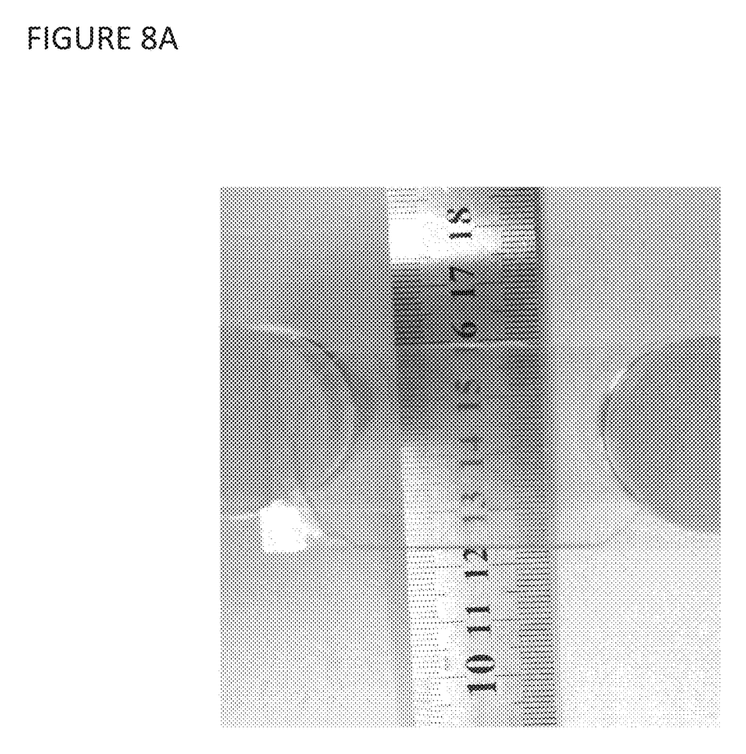
FIG. 8A shows a thermochromic window sample in the cold "Off" state.
Figure 8B:
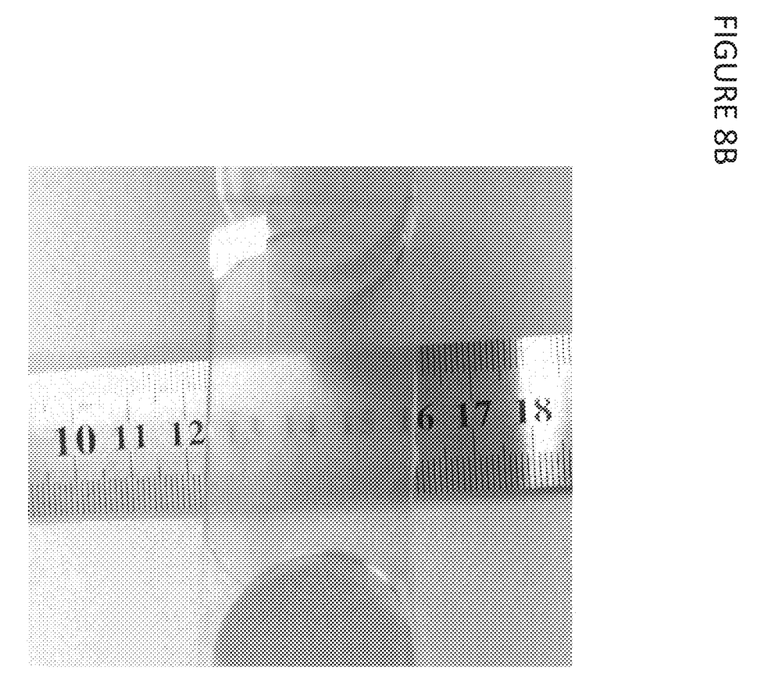
FIG. 8B shows a thermochromic window sample in the hot "On" state.

FIG. 8 shows (a) a photo taken of a thermotropic device in which the host material is a mixture of optical adhesives A and B at a ratio of 60:40, respectively, and the concentrations of NaCl particles is 29 wt %, at room temperature in the transparent "Off" state. Part (b) shows a photo taken of a thermotropic device in which the host material is a mixture of optical adhesives A and B at a ratio of 60:40, respectively, and the concentrations of NaCl particles is 29 wt %, at a temperature of ~80° C. in the translucent "On" state.

Figure 9:
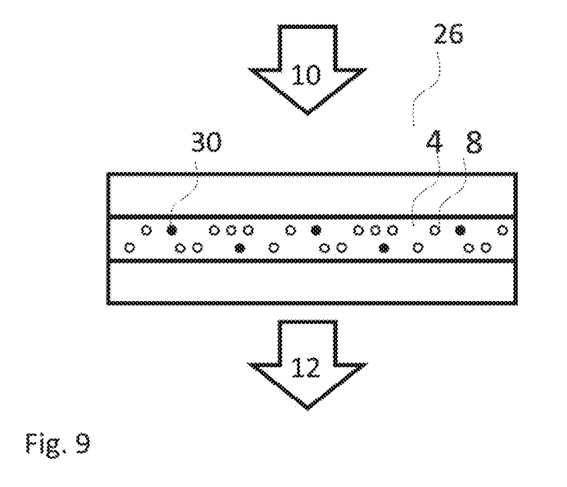
FIG. 9 depicts a cross-sectional view of the thermotropic device with additional absorbing nano-particles, dyes or pigments.

FIG. 9 depicts a cross-sectional view of the thermotropic device 26. Solar light 10 enters the room, in direction 12. The thermotropic layer 4 is composed of the host matrix and the scattering nano or microparticles 8 with additional absorbing nano-particles, dyes or pigments 30. During the "Off" state, when the device is transparent, the light absorbers provide some attenuation of visible and/or infrared solar light. During the "On" state, when the device becomes translucent due to scattering of light, the absorption of light penetrating the device by the light absorbing particles, dyes or pigments 30 is enhanced because of the longer path the light is taking through the host material due to the scattering.

Figure 10:
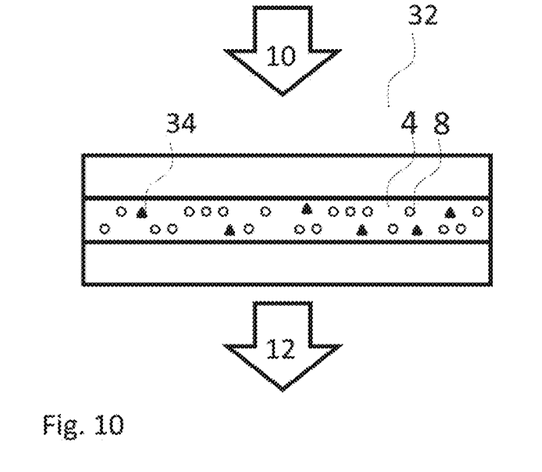
FIG. 10 depicts a cross-sectional view of the thermotropic device with additional thermochromic $VO_2$ nano-particles.

FIG. 10 depicts a cross-sectional view of the thermotropic device 32. Solar light 10 enters the room, in direction 12.

The thermotropic layer 4 is composed of the host matrix and the scattering nano or microparticles 8 with additional thermochromic $VO_2$ nano-particles 34. The inclusion of $VO_2$ in the device increases the modulation of light attenuation between the "Off" and "On" states. During the "Off" state, when the device is transparent, the $VO_2$ nanoparticles provide little attenuation of visible and infrared solar light that can be controlled during production stage via the $VO_2$ concentration in the device. During the "On" state, when the device becomes translucent and scatters light due to higher ambient temperature, the absorption of the thermochromic $VO_2$ nano-particles 34 increases due to a phase change from insulator to metallic that the $VO_2$ material is going through. In this case, the absorption of the metallic state $VO_2$ nano-particles is enhanced two folds; first because of the longer path the light is taking through the host material due to the scattering and second because of its phase transition.

Figure 11:
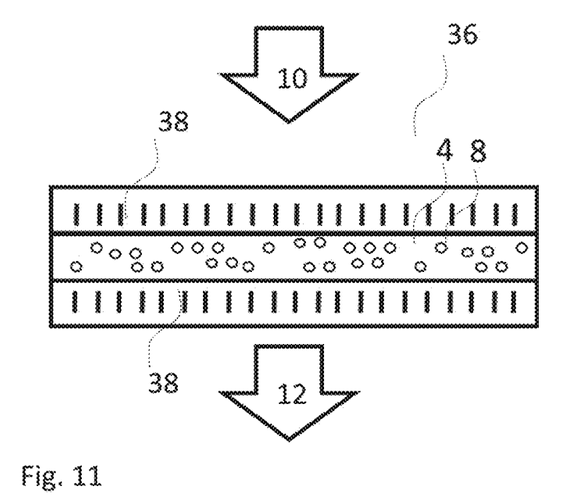
FIG. 11 depicts a cross-sectional view of the thermotropic device positioned in between two polarizers having aligned polarization.

FIG. 11 depicts a cross-sectional view of the thermotropic device 36. Solar light 10 enters the room, in direction 12. The thermotropic layer 4 is composed of the host matrix and the scattering nano or microparticles 8 and is positioned between two linear polarizers 38 with aligned polarization. In the "Off" state the first polarizer attenuates the light by approximately 50% and linearly polarizes it. The light then propagates through the thermotropic layer and the second polarizer with no significant further attenuation. In the "On" state, as well, the first polarizer attenuates the light by approximately 50% and linearly polarizes it. However, then the passing light propagates through the scattering medium and due to the scattering it loses its linear polarization. By the time it reaches the other side of the scattering thermotropic medium it is mostly arbitrarily polarized and therefore being further attenuated by the second polarizer 38. In that way, the modulation between the "Off" and "On" states attenuation is increased as compared to the stand alone thermotropic device.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A thermotropic coating, limiting transmission of solar energy there-through, comprising:
   salt nanoparticles or salt microparticles, embedded in a solid transparent host matrix;
   said coating being reversible between: a translucent and non-transmittant state; and
   a transparent and transmittant state; said state depending on the ambient temperature;
   wherein said host and said salt particles are selected such that a change in ambient temperature induces a change in the refraction index of said matrix at a first rate, and induces a change in the refraction index of said embedded salt particles at a second rate different from the first rate, to produce scattering and reflection of solar light and thus limit transmission of light passing there through, as a function of the ambient temperature.

2. The thermotropic coating of claim 1, wherein said coating is formulated such that at a pre-determined temperature the refractive indices of said host matrix layer and of said embedded salt particles are similar, yielding minimal light scattering and relatively high transmittance.

3. The thermotropic coating of claim 1 wherein said coating is formulated to be transparent at low ambient temperature, thus allowing light and heat to enter a window coated with said coating, for maximal savings of lighting and heating expenses.

4. The thermotropic coating of claim 1 wherein said coating is formulated to be translucent when the ambient temperature reaches a predefined high temperature, said coating back-scattering the majority of the solar heat and light impinging on it, for maximal savings of lighting and cooling expenses.

5. The thermotropic coating of claim 1 wherein said matrix is formed of an organic polymer having a refractive index which varies as a function of the temperature.

6. The thermotropic coating of claim 1 wherein said salt particles are made of an inorganic material, having a refractive index which varies at a slower rate as a function of the temperature, than the rate of variation of said refractive index of said matrix.

7. The thermotropic coating of claim 1, wherein said coating is formulated to be transparent at a predefined temperature, by selecting two compatible polymeric matrices, wherein a first matrix has a refractive index higher than that of the salt particles, and a second matrix has a lower refractive index than that of the salt particles, and said two polymers are mixed at a predetermined ratio, to select the exact temperature at which said coating is transparent.

8. The thermotropic coating of claim 1, wherein said coating is sandwiched or laminated between two transparent layers of glass, polymer or crystal panes.

9. The thermotropic coating of claim 1 wherein said coating is present as a laminating layer adhered or glued to transparent glass or polymer window-panes.

10. The thermotropic coating of claim 1, wherein said coating is comprised of environmentally friendly materials.

11. The thermotropic coating of claim 1 where said host matrix is organic and selected from: a polymer film, a polymerizable composition, or a transparent adhesive.

12. The thermotropic coating of claim 1 where said host matrix is inorganic and selected from: mineral glass, sol-gel.

13. The thermotropic coating of claim 1 where said host matrix is an inorganic-organic composite.

14. The thermotropic coating of claim 1 where the host is selected from: a UV cured transparent adhesive; an epoxy based transparent adhesive; a silicone based transparent adhesive; a polymer host matrix selected from: Polyvinyl butyral (PVB), Cellulose acetate butyrate (CAB), and Cellulose acetate (CA); Acrylic polymers; and combinations thereof.

15. The thermotropic coating of claim 1 where said salt microparticles or nanoparticles are selected from: LiF, LiCl, LiBr, LiI, NaF, NaCl, NaBr, NaI, KF, KCl, KBr, KI, RbF, RbCl, RbBr, RbI, CsF, CsCl, CsBr, CsI, $BaF_2$, $CaF_2$, $MgF_2$, ZnSe, ZnS; and mixtures and combinations thereof.

16. The thermotropic coating of claim 1, further comprising a stabilizer selected from: a hindered amine light stabilizer (HALS), a UV absorber, a thermal stabilizer, a singlet oxygen quencher, an antioxidant, and any combination thereof.

17. The thermotropic coating of claim 1 wherein said salt particles are encapsulated to prevent degradation and enhance the dispersability of said particles.

18. The thermotropic coating of claim 1 further comprising light absorbing materials embedded in the host material to increase the modulation of light attenuation between said two states of said coating.

19. The thermotropic coating of claim 1 further comprising thermochromic nano-particles to increase the modulation of light attenuation between said two states of said coating.

20. The thermotropic coating of claim 19, wherein said thermochromic nano-particles are formed of vanadium dioxide ($VO_2$).

21. The thermotropic coating of claim 1 wherein said coating is positioned between two polarizers oriented in the same linear polarization, to increase the modulation of light attenuation between said two states of said coating.

22. The thermotropic coating of claim 1, wherein said host matrix is present in a layer of maximal thickness of 500 microns.

23. A laminate article comprising the thermotropic coating of claim 1, wherein said coating is present as an internal layer located within an upper window layer and a lower window layer.

24. An optical power-limiting article comprising the coating of claim 1, wherein said article is selected from: a window, a green house cover, a sun roof, a solar panel, and a protection-layer on a roof or walls.

25. The article of claim 24, wherein power limiting is passive and self-adaptive.

* * * * *